United States Patent
Hoppe

(10) Patent No.: US 10,851,487 B2
(45) Date of Patent: Dec. 1, 2020

(54) APPLIANCE WITH CONTEXT-SENSITIVE FIXED-POSITION USER INTERFACE

(71) Applicant: Midea Group Co., Ltd., Foshan (CM)

(72) Inventor: Christopher G. Hoppe, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 251 days.

(21) Appl. No.: 16/022,182

(22) Filed: Jun. 28, 2018

(65) Prior Publication Data

US 2020/0002867 A1    Jan. 2, 2020

(51) Int. Cl.

| | |
|---|---|
| *D06F 34/32* | (2020.01) |
| *D06F 33/00* | (2020.01) |
| *D06F 34/28* | (2020.01) |
| *G06F 3/0482* | (2013.01) |
| *G06F 3/0488* | (2013.01) |

(52) U.S. Cl.
CPC .............. *D06F 34/32* (2020.02); *D06F 33/00* (2013.01); *D06F 34/28* (2020.02); *G06F 3/0482* (2013.01); *G06F 3/0488* (2013.01)

(58) Field of Classification Search
CPC .......... D06F 33/00; D06F 34/28; D06F 34/32; G06F 3/0482; G06F 3/0488
See application file for complete search history.

(56) References Cited

U.S. PATENT DOCUMENTS

| | | |
|---|---|---|
| 4,894,493 A | 1/1990 | Smith et al. |
| 5,239,152 A | 8/1993 | Caldwell et al. |
| 5,698,826 A | 12/1997 | Cracraft et al. |
| 6,137,072 A | 10/2000 | Martter et al. |
| D462,573 S | 9/2002 | Staebler et al. |
| 7,246,395 B2 | 7/2007 | Buckroyd et al. |
| 7,499,003 B2 | 3/2009 | Rudolph et al. |
| 7,915,552 B2 | 3/2011 | Kim |
| 8,149,218 B2 | 4/2012 | Garfio et al. |
| 8,164,030 B2 | 4/2012 | Isoda et al. |
| 8,567,976 B2 | 10/2013 | Hamlin et al. |
| 8,604,393 B2 | 12/2013 | Odriozola |
| 9,119,291 B2 | 8/2015 | Moncrieff |
| 9,513,013 B2 | 12/2016 | May et al. |
| 9,528,696 B2 | 12/2016 | Bach et al. |
| 2009/0050174 A1* | 2/2009 | Gheparde ............. B08B 7/0071 134/1 |
| 2011/0099727 A1* | 5/2011 | Kim ........................ D06F 34/18 8/137 |

(Continued)

OTHER PUBLICATIONS

"ATA5020 Digital Glass Control Panel" www.atmcexim.com. Retrieved on Sep. 1, 2017.

(Continued)

*Primary Examiner* — Joseph L. Perrin

(74) *Attorney, Agent, or Firm* — Middleton Reutlinger

(57) ABSTRACT

An appliance and method utilize a context-sensitive fixed-position user interface including cycle type controls used to select a cycle type and cycle configuration controls used to configure settings associated with particular cycle types. Indicators of the cycle type and cycle configuration controls are selectively set to active or inactive states during cycle type selection and cycle configuration phases to facilitate user configuration of settings for the appliance prior to performing an appliance cycle.

19 Claims, 6 Drawing Sheets

(56) References Cited

U.S. PATENT DOCUMENTS

| | | | |
|---|---|---|---|
| 2013/0249847 A1 | 9/2013 | Goss et al. | |
| 2014/0141194 A1* | 5/2014 | Lynam | D06F 39/14 |
| | | | 428/81 |
| 2015/0047129 A1* | 2/2015 | Bae | D06F 25/00 |
| | | | 8/137 |
| 2015/0106710 A1* | 4/2015 | Dirschus | A47L 15/0063 |
| | | | 715/708 |
| 2015/0160850 A1 | 6/2015 | Krause | |
| 2016/0179235 A1 | 6/2016 | Winkelmann et al. | |
| 2016/0230328 A1* | 8/2016 | Bae | D06F 33/00 |
| 2018/0349009 A1* | 12/2018 | Breme | D06F 58/30 |
| 2019/0024282 A1* | 1/2019 | Lee | D06F 37/28 |
| 2020/0032446 A1* | 1/2020 | Bockos | D06F 34/28 |

OTHER PUBLICATIONS

Hahn, et al. "Vanishing Buttons" www.appliancedesign.com. Apr. 1, 2017.

\* cited by examiner

APPLIANCE WITH CONTEXT-SENSITIVE FIXED-POSITION USER INTERFACE

BACKGROUND

Major appliances such as laundry treatment appliances (e.g., laundry washing machines, dryers, combination washer/dryers, etc.), dishwashers, ranges, ovens, etc. are used in many single-family and multi-family residential applications. Due to the wide variety of applications in which these appliances may be used, many appliances provide a wide variety of user-configurable settings to control various aspects of an appliance's operation. For example, due to the wide variety of items that may need to be cleaned by a laundry washing machine, many laundry washing machines provide a wide variety of user-configurable settings to control various aspects of a wash cycle such as water temperatures and/or amounts, agitation, soaking, rinsing, spinning, etc. These various cycle settings can have an appreciable effect on washing performance, as well as on energy and/or water consumption, so it is generally desirable for the settings used by a laundry washing machine to appropriately match the needs of each load washed by the machine.

Some appliances also support the concept of predetermined cycle types that represent combinations of settings for particular applications. As an example, some laundry washing machines support user selection of load types, typically based on the types of fabrics and/or items in the load. Some laundry washing machines, for example, have load type settings such as colors, whites, delicates, cottons, permanent press, towels, bedding, heavily soiled items, etc., which generally represent specific combinations of settings that are optimized for particular load types so that a user is not required to select individual values for each of the controllable settings of a laundry washing machine.

While manual cycle type selection in many cases simplifies a user's interaction with an appliance, such manual selection still can lead to suboptimal performance due to, for example, user inattentiveness or lack of understanding of which cycle types are best suited for their particular loads. Moreover, many control panels and other user interfaces on such appliances present a dizzying array of controls, labels and icons that can be difficult for users to understand.

Therefore, a significant need continues to exist in the art for a manner of optimizing the performance of an appliance for different types of applications, as well as reducing the burden on users when interacting with an appliance.

SUMMARY

The herein-described embodiments address these and other problems associated with the art by providing an appliance and method that utilize a context-sensitive fixed-position user interface including cycle type controls used to select a cycle type and cycle configuration controls used to configure settings associated with particular cycle types. Indicators of the cycle type and cycle configuration controls are selectively set to active or inactive states during cycle type selection and cycle configuration phases to facilitate user configuration of settings for the appliance prior to performing an appliance cycle.

Therefore, consistent with one aspect of the invention, a laundry washing machine may include a container rotatably disposed within a housing, a door mounted to the housing to provide access to the container, a drive system configured to rotate the container, a controller coupled to the drive system and configured to perform a wash cycle, the controller supporting a plurality of wash cycle types and a plurality of settings for the wash cycle, where at least a portion of the plurality of settings are unused by at least one of the plurality of wash cycle types, and a touch-sensitive glass control panel mounted on the housing or the door, the touch-sensitive glass control panel including a plurality of touch-sensitive regions respectively defining a plurality of controls, and where each control includes an associated function performed by the control and an associated indicator disposed at a fixed position on the touch-sensitive glass control panel, where the indicator of each control includes an active state that identifies the associated function of the control and an inactive state that substantially hides the associated function of the control. The plurality of controls includes a plurality of wash cycle type controls, where the function of each wash cycle type control selects an associated wash cycle type from among the plurality of wash cycle types, and a plurality of wash cycle configuration controls, where the function of each wash cycle configuration control configures one or more associated settings among the plurality of settings. The controller configures the wash cycle prior to performing the wash cycle based upon user input received through the touch-sensitive glass control panel, during a wash cycle type selection phase the controller sets to the active state the indicator of each of the plurality of wash cycle type controls, sets to the inactive state the indicator of each of the plurality of wash cycle configuration controls, and receives user input that selects a first wash cycle type control among the plurality of wash cycle type controls, and during a cycle configuration phase initiated after the first wash cycle type control is selected, the controller sets to the inactive state the indicator of each wash cycle type control other than the first wash cycle type control, sets to the active state the indicators of one or more wash cycle configuration controls from among the plurality of wash cycle configuration controls that are associated with functions that are pertinent to the associated wash cycle type for the first wash cycle type control, and receives user input that configures one or more settings among the plurality of settings using the one or more wash cycle configuration controls having indicators set to the active state.

Consistent with another aspect of the invention, an appliance may include a controller configured to perform an appliance cycle with the appliance, the controller supporting a plurality of cycle types and a plurality of settings for the appliance cycle, where at least a portion of the plurality of settings are unused by at least one of the plurality of cycle types, and a user interface coupled to the controller and including a plurality of controls, where each control includes an associated function performed by the control and an associated indicator disposed at a fixed position in the user interface, and where the indicator of each control includes an active state that identifies the associated function of the control and an inactive state that substantially hides the associated function of the control. The plurality of controls includes a plurality of cycle type controls, where the function of each cycle type control selects an associated cycle type from among the plurality of cycle types, and a plurality of cycle configuration controls, where the function of each cycle configuration control configures one or more associated settings among the plurality of settings. The controller configures the appliance cycle prior to performing the appliance cycle based upon user input received through the user interface, where during a cycle type selection phase the controller sets to the active state the indicator of each of the plurality of cycle type controls, sets to the inactive state the indicator of each of the plurality of cycle configuration controls, and receives user input that selects a first cycle type control among the plurality of cycle type controls, and where during a cycle configuration phase initiated after the first cycle type control is selected, the controller sets to the inactive state the indicator of each cycle type control other than the first cycle type control, sets to the active state the indicators of one or more cycle configuration controls from among the plurality of cycle configuration controls that are associated with functions that are pertinent to the associated cycle type for the first cycle type control, and receives user input that configures one or more settings among the plurality of settings using the one or more cycle configuration controls having indicators set to the active state.

In some embodiments, the appliance includes a container rotatably disposed in a housing, a door mounted to the housing to provide access to the container, and a drive system configured to rotate the container, where the controller is coupled to the drive system and the appliance cycle includes a wash cycle for washing a load of clothing, and where the user interface is mounted on the housing or the door.

Further, in some embodiments, the user interface includes a touch-sensitive glass control panel, where each of the plurality of controls includes a touch-sensitive region of the touch-sensitive glass control panel, and where the indicator of each of the plurality of controls is backlit through the touch-sensitive glass control panel.

In some embodiments, the indicator of each of the plurality of controls substantially invisible to the user when in the inactive state. Further, in some embodiments, the indicator of each of the plurality of controls is illuminated in the inactive state with an intensity that is dimmer than in the active state. Also, in some embodiments, the indicator of each of the plurality of controls is not illuminated when in the inactive state. In addition, in some embodiments, the controller is further configured to, during the cycle configuration phase, set the first cycle type control to a selected state that is visually distinct from the active state.

In some embodiments, the plurality of controls includes at least one physical button. In addition, in some embodiments, the plurality of controls includes at least one membrane switch. Also, in some embodiments, the plurality of cycle configuration controls includes at least one variable configuration control that selects from among a plurality of setting values for a first setting among the plurality of settings. In addition, in some embodiments, the at least one variable configuration controls is a temperature control, a soil level control or a spin control.

In some embodiments, the at least one variable configuration control includes a plurality of touch-sensitive regions that select from among the plurality of setting values. Further, in some embodiments, the plurality of cycle configuration controls includes at least one optional feature control that selectively enables and disables an optional feature. In addition, in some embodiments, the user interface further includes a numerical display.

Further, in some embodiments, the user interface further includes a power control and a start/pause control, where the controller is configured to set the start/pause control to the active state during the cycle configuration phase and set the start/pause control to the inactive state during the cycle type selection phase. Moreover, in some embodiments, the controller is further configured to, in the cycle configuration phase, initialize a variable configuration control or an optional feature control to a default value associated with the first cycle type control. Further, in some embodiments, the user interface further includes a phase indicator, where the controller is configured to set the phase indicator to the active state during the cycle configuration phase.

Consistent with another aspect of the invention, a method is provided for performing an appliance cycle with an appliance of the type having a controller supporting a plurality of cycle types and a plurality of settings for the appliance cycle and a user interface coupled to the controller and including a plurality of controls. Each control includes an associated function performed by the control and an associated indicator disposed at a fixed position in the user interface, where the indicator of each control includes an active state that identifies the associated function of the control and an inactive state that substantially hides the associated function of the control, where at least a portion of the plurality of settings are unused by at least one of the plurality of cycle types, and where the plurality of controls includes a plurality of cycle type controls that each have a function that selects an associated cycle type from among the plurality of cycle types, and a plurality of cycle configuration controls that each have a function that configures one or more associated settings among the plurality of settings. The method includes, with the controller, during a cycle type selection phase, setting to an active state the indicator of each of the plurality of cycle type controls, setting to the inactive state the indicator of each of the plurality of cycle configuration controls, and receiving user input that selects a first cycle type control among the plurality of cycle type controls, during a cycle configuration phase initiated after the first cycle type control is selected, setting to the inactive state the indicator of each cycle type control other than the first cycle type control, setting to the active state the indicators of one or more cycle configuration controls from among the plurality of cycle configuration controls that are associated with functions that are pertinent to the associated cycle type for the first cycle type control, and receiving user input that configures one or more settings among the plurality of settings using the one or more cycle configuration controls having indicators set to the active state, and thereafter performing the appliance cycle in the appliance using the configured one or more settings.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
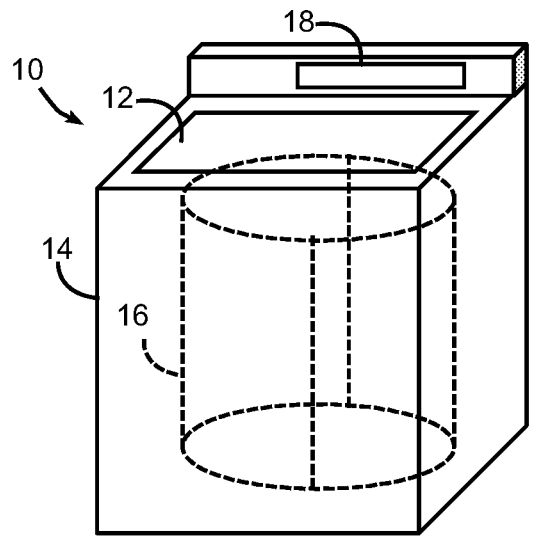
FIG. 1 is a perspective view of a top-load laundry washing machine consistent with some embodiments of the invention.

Embodiments consistent with the invention may be used to configure a plurality of settings of an appliance cycle performed by an appliance based upon user input received through a context-sensitive fixed-position user interface.

An appliance, in this regard, may include various types of residential appliances such as cooking appliances (e.g., ovens, cooktops, ranges, etc.), dishwashers, refrigerators, and laundry treatment appliances (e.g., washing machines, dryers, combination washer/dryers, etc.), among others. An appliance cycle, in turn, refers to an operational cycle of an appliance for which various settings may be configured to control how the appliance performs the operations cycle. For laundry treatment appliances, as an example, various settings may be used to configure how a laundry treatment cycle is implemented, e.g., to control a wash water temperature, a rinse water temperature, a wash water amount, a rinse water amount, a speed or stroke of agitation during washing and/or rinsing, a spin speed, whether or not agitation is used during washing and/or rinsing, whether or not spinning is performed, a duration of a wash, rinse, soak, or spin phase of a wash cycle, a number of repeats of a wash, rinse, soak or spin phase, selection between different rinse operation types such as a spray rinse operation or a deep fill rinse operation, pre-treatment such as soaking over time with a prescribed water temperature and specific agitation stroke, a steam feature, a sanitize feature, a drying temperature, a drying time, a dryness setting, etc. For other types of appliances, however, other settings pertinent to the particular appliance cycle may be used, as will be appreciated by those of ordinary skill having the benefit of the instant disclosure.

As will become more apparent below, a context-sensitive fixed-position user interface may be implemented on various types of appliances, e.g., on or otherwise mounted or coupled to a housing/cabinet or door thereof. The user interface may be considered to be a context-sensitive fixed-position user interface to the extent that at least a portion of the user controls of the user interface are context-sensitive fixed-position controls.

A control is a fixed-position control to the extent that the control, as well as an indicator that is associated with the control and that indicates a function associated with the control, is located at a fixed, unique and unchanging position on the user interface, as opposed to a control that may be located at different positions in the user interface or a control that shares the same position as another control, as may be the case, for example, with touchscreens where controls are defined by regions of a touchscreen and indicated based upon graphics or text displayed in those regions to demarcate the extents of the controls. A control is a context-sensitive control to the extent that the control has at least active and inactive states, the former of which is a state that is capable of receiving user input and performing its associated function in response thereto, and the latter of which is a state during which the control does not receive user input and its associated function is disabled. Moreover, the active state also is associated with a display state of the indicator of the control that identifies to a user the function that is associated with that control (e.g., using text and/or an icon), while the inactive state is associated with a display state of the indicator that substantially hides the function that is associated with that control to indicate that the control is inactive (e.g., by dimming or disabling illumination of the indicator). Thus, by switching between active and inactive states for a control, the control is selectively enabled in a context-sensitive manner.

Context-sensitive fixed-position controls may be implemented in various appliances in a number of different manners. In some embodiments, for example, a touch-sensitive glass control panel may be used, whereby individual controls are implemented as touch-sensitive (e.g., capacitive or pressure sensitive) regions of the glass panel, and generally with indicators defined by transparent portions of the glass panel through which back-lit illumination is provided. Controls may be implemented in other manners in other embodiments, however, including using buttons (raised, flat or sunken), sliders, knobs, membrane switches, etc.

The context-sensitive fixed-position controls of the user interface may include, among other types of controls, multiple cycle type controls and multiple cycle configuration controls. The cycle type controls have associated functions that may be used to select from among multiple cycle types for an appliance, where a cycle type may be considered to represent a set or combination of settings for an appliance cycle based upon some type classification. Cycle types for laundry treatment appliances such as laundry washing machines and laundry dryers may include types such as cotton, synthetics, colors, whites, heavy duty, quick wash, comforters, sheets, towels, delicates, sanitize, steam, and allergen, among others, and it will be appreciated that cycle types may also be defined for other types of appliances, e.g., cooking appliances such as ranges, cooktops, or ovens; refrigerators; dishwashers; etc.

The cycle configuration controls have associated functions that may be used to configure one or more settings that are pertinent to a selected cycle type. The cycle configuration controls, as a group, may be sufficient to configure all configurable settings for all of the cycle types supported by an appliance; however, for one or more of the cycle types, some settings may not be configurable, and as such, may be unused by those cycle types. In such instances, the associated cycle configuration controls may be inactivated when those cycle types are selected by a user.

In some embodiments, the cycle configuration controls may further be partitioned into variable configuration controls and optional feature controls, the former of which select from among a plurality (e.g., a range) of setting values, and the latter of which are binary in nature, activating or deactivating particular optional features of a cycle. For a laundry washing machine, for example, variable configuration controls may include controls for settings such as temperature, spin speed, soil level, etc., while optional feature controls may include controls for settings such as soak, steam, extra rinse, no spin, fabric softener, eco wash, signal, etc. For other types of appliances, other types of configurable settings may be used, as will be appreciated by those of ordinary skill in the art having the benefit of the instant disclosure.

As will become more apparent below, with user interfaces consistent with the invention, configuration of a cycle prior to performance of that cycle by an appliance may be performed using at least two phases to facilitate user interaction with the appliance. In a cycle type selection phase, a cycle type is selected based upon user selection of a cycle type control, and then, once the cycle type is selected, a cycle configuration phase is initiated to enable a user to interact with one or more cycle configuration controls to configure one or more settings used by the selected cycle type.

During the cycle type selection phase, the indicators of the cycle type controls are set to the active state to identify the cycle types associated with the controls, while the indicators of the cycle configuration controls are deactivated to substantially hide the functions of those controls, thereby decluttering the user interface and focusing the user's attention on the cycle types from which the user may select.

Then, once a cycle type is selected, the indicators of the non-selected cycle type controls may be deactivated, and in some embodiments the indicator of the selected cycle type control may be maintained in the active state, or may be transitioned to a third state (e.g., with a different illumination level and/or color) to indicate the selected status of the control. In addition, based upon the selected cycle type the indicators of one or more of the cycle configuration controls that are pertinent to the selected cycle type may be set to the active state to present the user with the cycle configuration controls that may be interacted with in order to configure the settings of the selected cycle type.

Numerous additional variations and modifications will be apparent to one of ordinary skill in the art, as will become apparent from the description below. Therefore, the invention is not limited to the specific implementations discussed herein.

Turning now to the drawings, wherein like numbers denote like parts throughout the several views, FIG. 1 illustrates an example laundry treatment appliance, here a laundry washing machine 10, in which the various technologies and techniques described herein may be implemented. Laundry washing machine 10 is a residential-type top-load washing machine, and as such includes a top-mounted door 12 in a cabinet or housing 14 that provides access to a vertically-oriented wash tub 16 housed within the cabinet or housing 14. Door 12 is generally hinged along a side or rear edge and is pivotable between the closed position illustrated in FIG. 1 and an opened position (not shown). When door 12 is in the opened position, clothes and other washable items may be inserted into and removed from wash tub 16 through an opening in the top of cabinet or housing 14. Control over washing machine 10 by a user is generally managed through a control panel 18 disposed on a backsplash and implementing a user interface for the washing machine, and it will be appreciated that in different washing machine designs, control panel 18 may include various types of input and/or output devices, including various knobs, buttons, lights, switches, textual and/or graphical displays, touch screens, etc. through which a user may configure one or more settings and start and stop a wash cycle.

Figure 2:
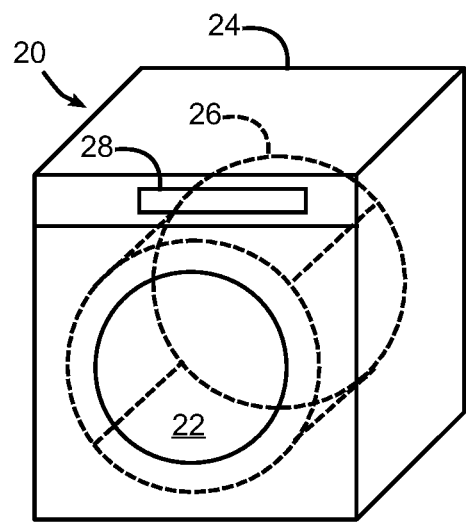
FIG. 2 is a perspective view of a front-load laundry washing machine consistent with some embodiments of the invention.

As noted above, laundry washing machine 10 is an example of a residential-type top-load laundry washing machine, such as the type that may be used in single-family or multi-family dwellings, or in other similar applications. However, it will be appreciated that the herein-described techniques may also be used in connection with other types of appliances, including other types of laundry washing machines in some embodiments. For example, the herein-described techniques may be used in commercial applications in some embodiments. Moreover, the herein-described techniques may be used in connection with other laundry treatment appliance configurations, including laundry dryers, combined washer/dryers and other laundry washing machine designs. FIG. 2, for example, illustrates a front-load laundry washing machine 20 that includes a front-mounted door 22 in a cabinet or housing 24 that provides access to a horizontally-oriented wash tub 26 housed within the cabinet or housing 24, and that has a control panel 28 positioned towards the front of the machine rather than the rear of the machine as is typically the case with a top-load laundry washing machine. Implementation of the herein-described techniques selection within a front-load laundry washing machine would be well within the abilities of one of ordinary skill in the art having the benefit of the instant disclosure, so the invention is not limited to the top-load implementation discussed further herein. It will also be appreciated that FIGS. 1 and 2 are also representative of top-load and front-load laundry dryers, but where the wash tubs 16, 26 are replaced with drums, as will be appreciated by those skilled in the art.

Figure 3:
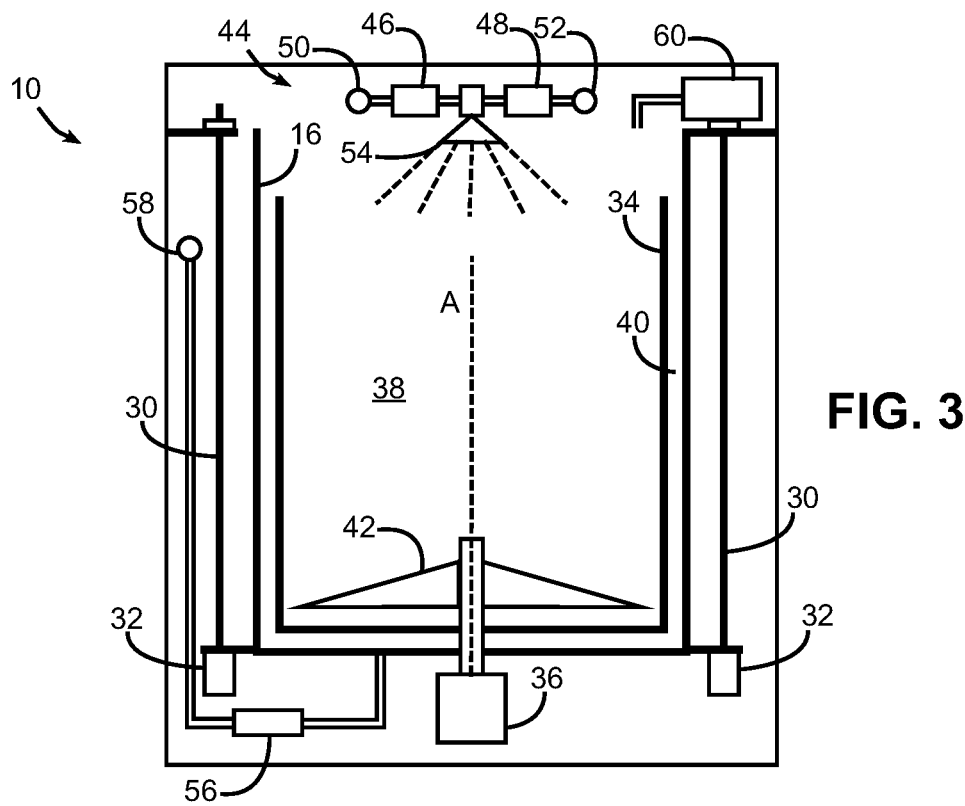
FIG. 3 is a functional vertical section of the laundry washing machine of FIG. 1.

FIG. 3 functionally illustrates a number of components in laundry washing machine 10 as is typical of many washing machine designs. For example, wash tub 16 may be vertically oriented, generally cylindrical in shape, opened to the top and capable of retaining water and/or wash liquor dispensed into the washing machine. Wash tub 16 may be supported by a suspension system such as a set of support rods 30 with corresponding vibration damper cylinders 32.

Disposed within wash tub 16 is a container or wash basket 34 that is rotatable about a generally vertical axis A by a drive system 36. Wash basket 34 is generally perforated or otherwise provides fluid communication between an interior 38 of the wash basket 34 and a space 40 between wash basket 34 and wash tub 16. Drive system 36 may include, for example, an electric motor and a transmission and/or clutch for selectively rotating the wash basket 34. In some embodiments, drive system 36 may be a direct drive system, whereas in other embodiments, a belt or chain drive system may be used. It will be appreciated that where the laundry treatment appliance is a dryer, the container may be a drum.

In addition, in some embodiments an agitator 42 such as an impeller, auger or other agitation element may be disposed in the interior 38 of wash basket 34 to agitate items within wash basket 34 during a washing operation. Agitator 42 may be driven by drive system 36, e.g., for rotation about the same axis as wash basket 34, and a transmission and/or clutch within drive system 36 may be used to selectively rotate agitator 42. In other embodiments, separate drive systems may be used to rotate wash basket 34 and agitator 42.

A water inlet 44 may be provided to dispense water into wash tub 16. In some embodiments, for example, hot and cold valves 46, 48 may be coupled to external hot and cold water supplies through hot and cold inlets 50, 52, and may output to one or more nozzles 54 to dispense water of varying temperatures into wash tub 16. In addition, a pump system 56, e.g., including a pump and an electric motor, may be coupled between a low point, bottom or sump in wash tub 16 and an outlet 58 to discharge greywater from wash tub 16. In some embodiments, laundry washing machine 10 may also include a dispensing system 60 configured to dispense detergent, fabric softener and/or other wash-related products into wash tub 16, either from a bulk supply storing sufficient products for dispensing to multiple loads or from a single-use supply filled by a user prior to the start of a wash cycle.

Further, laundry washing machine 10 may also include various sensors for use in at least partially automating a wash cycle, e.g., one or more of a weight sensor, a fluid level sensor, a fluid property sensor, a temperature sensor, a flow sensor, etc. A weight sensor may be used to generate a signal that varies based in part on the mass or weight of the contents of wash tub 16. A fluid level sensor may be used to generate a signal that varies with the level or height of fluid in wash tub 16. A fluid property sensor, e.g., a turbidity sensor, may be used in some embodiments to measure one or more of the turbidity, clarity, conductivity or temperature of the fluid in wash tub 16, e.g., to sense the presence or relative amount of various wash-related products such as detergents or fabric softeners and/or to sense the presence or relative amount of soil in the fluid. A temperature sensor may be used to sense the temperature of fluid in wash tub 16 and/or fluid introduced through hot and/or cold inlets 50, 52. A flow sensor, e.g., one or more flowmeters, may be used to sense an amount of water dispensed into wash tub 16. Representative locations of these various types of sensors are not illustrated in FIG. 3 for reasons of simplifying the discussion; however, the various locations and configurations of such sensors will be apparent to those of ordinary skill having the benefit of the instant disclosure. It will be also be appreciated that some or all of these sensors may be omitted in some embodiments.

It will be appreciated that the particular components and configuration illustrated in FIG. 3 is typical of a number of common laundry washing machine designs. Nonetheless, a wide variety of other components and configurations are used in other laundry washing machine designs, and it will be appreciated that the herein-described functionality generally may be implemented in connection with these other designs, so the invention is not limited to the particular components and configuration illustrated in FIG. 3. Moreover, for a combined washer/dryer or laundry dryer, it will be appreciated that the components and configuration of such designs may vary considerably from that illustrated in FIG. 3, e.g., where the rotatable container is a drum, and no separate wash tub is used in the appliance.

Figure 4:
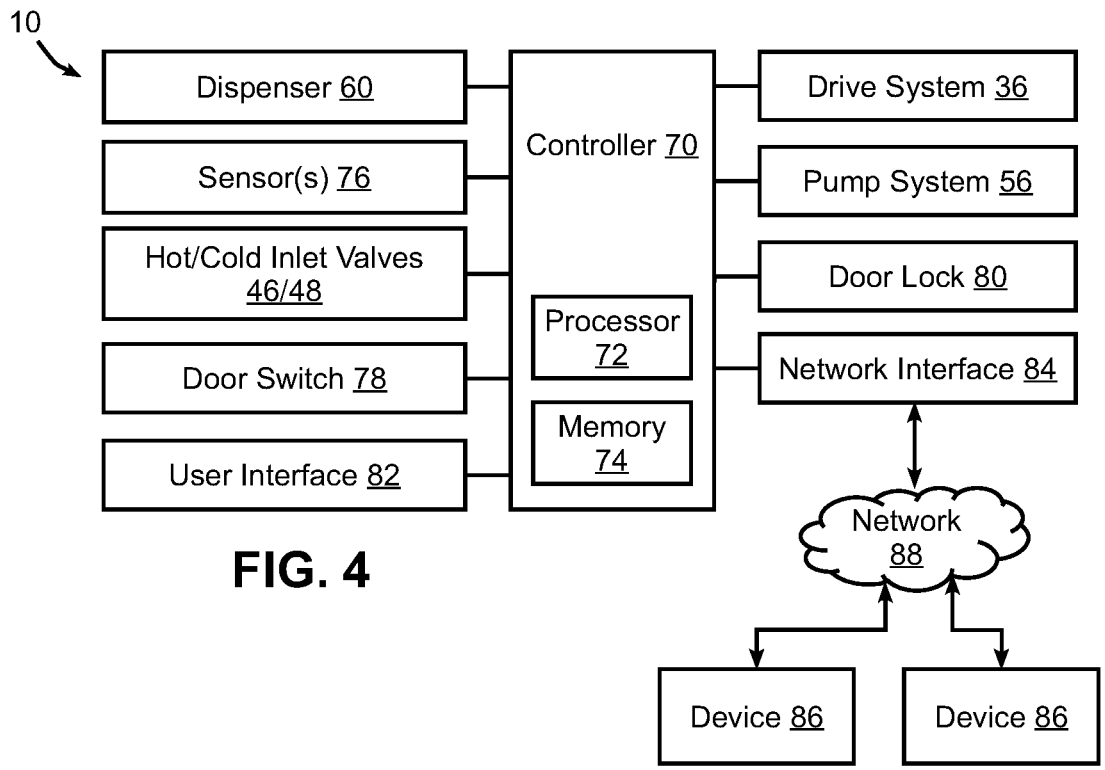
FIG. 4 is a block diagram of an example control system for the laundry washing machine of FIG. 1.

Now turning to FIG. 4, laundry washing machine 10 may be under the control of a controller 70 that receives inputs from a number of components and drives a number of components in response thereto. Controller 70 may, for example, include one or more processors 72 and a memory 74 within which may be stored program code for execution by the one or more processors. The memory may be embedded in controller 70, but may also be considered to include volatile and/or non-volatile memories, cache memories, flash memories, programmable read-only memories, read-only memories, etc., as well as memory storage physically located elsewhere from controller 70, e.g., in a mass storage device or on a remote computer interfaced with controller 70.

As shown in FIG. 4, controller 70 may be interfaced with various components, including the aforementioned drive system 36, hot/cold inlet valves 46, 48, pump system 56, sensors (e.g., weight, fluid property, flow, acceleration, temperature, etc., collectively represented at 76), a door switch 78 that detects whether door 12 is in an open or closed position and a door lock 80 that selectively locks door 12 in a closed position. Where controller 70 is interfaced with a laundry dryer or other type of laundry treatment appliance, the components to which controller is interfaced may vary considerably.

Moreover, controller 70 may be coupled to a user interface 82 including various input/output devices such as knobs, dials, sliders, switches, buttons, lights, textual and/or graphics displays, touch screen displays, speakers, image capture devices, microphones, etc. for receiving input from and communicating with a user. In addition, in some embodiments, controller 70 may also be coupled to one or more network interfaces 84, e.g., for interfacing with external devices 86 via wired and/or wireless networks such as Ethernet, Wi-Fi, Bluetooth, NFC, cellular and other suitable networks, collectively represented by network 88 in FIG. 4. Network 86 may incorporate in some embodiments a home automation network, and various communication protocols may be supported, including various types of home automation communication protocols. In other embodiments, other wireless protocols, e.g., Wi-Fi or Bluetooth, may be used.

Devices 86 may include, for example, various user devices such as computers, tablets, smart phones, wearable devices, etc., as well as various online services and devices, e.g., web or cloud services. Moreover, in some embodiments, at least a portion of controller 70 may be implemented externally from a laundry washing machine, e.g., within a mobile device, a cloud computing environment, etc., such that at least a portion of the functionality described herein is implemented within the portion of the controller that is externally implemented. Further, in some embodiments, at least a portion of user interface 82 may be implemented on a device 86, e.g., where a mobile device or tablet is used to configure setting values for a laundry treatment appliance and communicate those setting values to controller 70 for use during a laundry treatment cycle.

In some embodiments, controller 70 may operate under the control of an operating system and may execute or otherwise rely upon various computer software applications, components, programs, objects, modules, data structures, etc. In addition, controller 70 may also incorporate hardware logic to implement some or all of the functionality disclosed herein. Further, in some embodiments, the sequences of operations performed by controller 70 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the laundry treatment appliances illustrated in FIGS. 1-4 will be apparent to one of ordinary skill in the art, as will become apparent from the description below. Furthermore, while the disclosure hereinafter will focus on implementations of the herein-described techniques in a laundry washing machine, the invention is not so limited, and the herein-described techniques may be utilized for other types of appliances. Therefore, the invention is not limited to the specific implementations discussed herein.

Context-Sensitive Fixed-Position Laundry Washing Machine User Interface

Due to the myriad types of settings provided to users in various conventional appliance designs, it can be difficult for a user to select the optimal combination of setting values for performing an appliance cycle. For a laundry washing machine, as an example, it can be difficult for a user to select the optimal combination of setting values for treating a particular load of laundry. Embodiments consistent with the invention address these and other problems through the use of a context-sensitive fixed-position user interface based in part upon a plurality of context-sensitive fixed-position controls disposed on the housing or door of a laundry washing machine.

Figure 5:
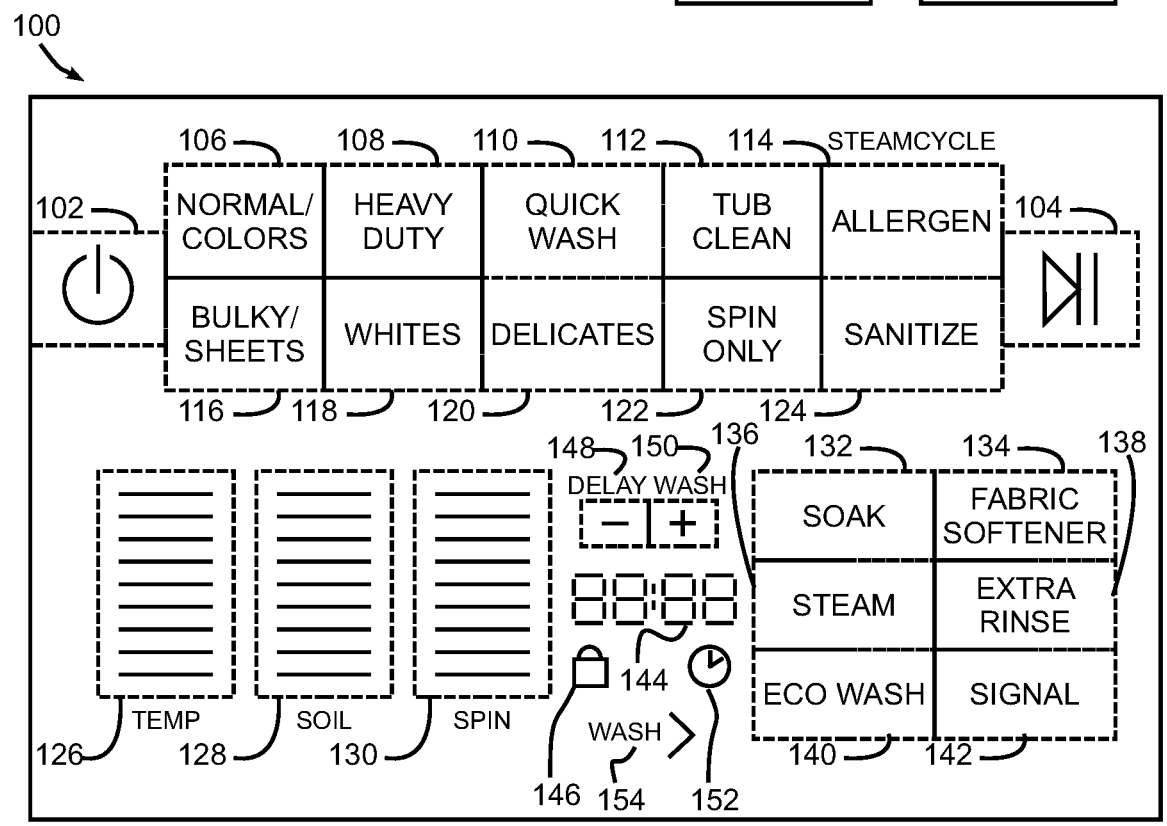
FIG. 5 illustrates an example implementation of a context-sensitive fixed-position user interface for use with the laundry washing machines of FIGS. 1-4.

FIG. 5, for example, illustrates an example context-sensitive fixed-position user interface 100, implemented in this embodiment using a touch-sensitive glass panel where controls are defined by touch-sensitive regions (denoted by dashed lines in FIG. 5) on the glass panel with indicators (e.g., using text and/or an icon) backlit through the glass panel. A power control 102 is used to power the laundry washing machine on and off, and a play/pause control 104 is used to start and pause a wash cycle.

User interface 100 includes a plurality of cycle type controls 106-124, including a normal/colors control 106, heavy duty control 108, quick wash control 110, tub clean control 112, allergen control 114, bulky/sheets control 116, whites control 118, delicates control 120, spin only control 122, and sanitize control 124. In addition, a plurality of cycle configuration controls 126-142 are provided in user interface 100, including three variable configuration controls (a temperature control 126, a soil level control 128 and a spin control 130, each configured to select from among a plurality of values for an associated setting) and six optional feature controls (a soak control 132, a fabric softener control 134, a steam control 136, an extra rinse control 138, an eco wash control 140 and a signal control 142).

User interface 100 may also include additional controls and/or displays, and it will be appreciated that the additional controls may or may not be context-sensitive fixed-position controls in some embodiments. For example, a numerical display 144 may be provided to indicate cycle duration, remaining duration, error codes, time of day, etc. A lock display 146 may be used to indicate when the machine is locked. Delay timer controls 148, 150 may be used to set a delay time for starting the wash cycle, and a delay display 152 may be used to indicate when a delay time has been set. In addition, a phase indicator 154 may be used to indicate when a wash cycle type has been selected and is ready to be started (e.g., by selecting play/pause control 104, either before or after one or more settings has been changed using cycle configuration controls 126-142).

Figure 6:
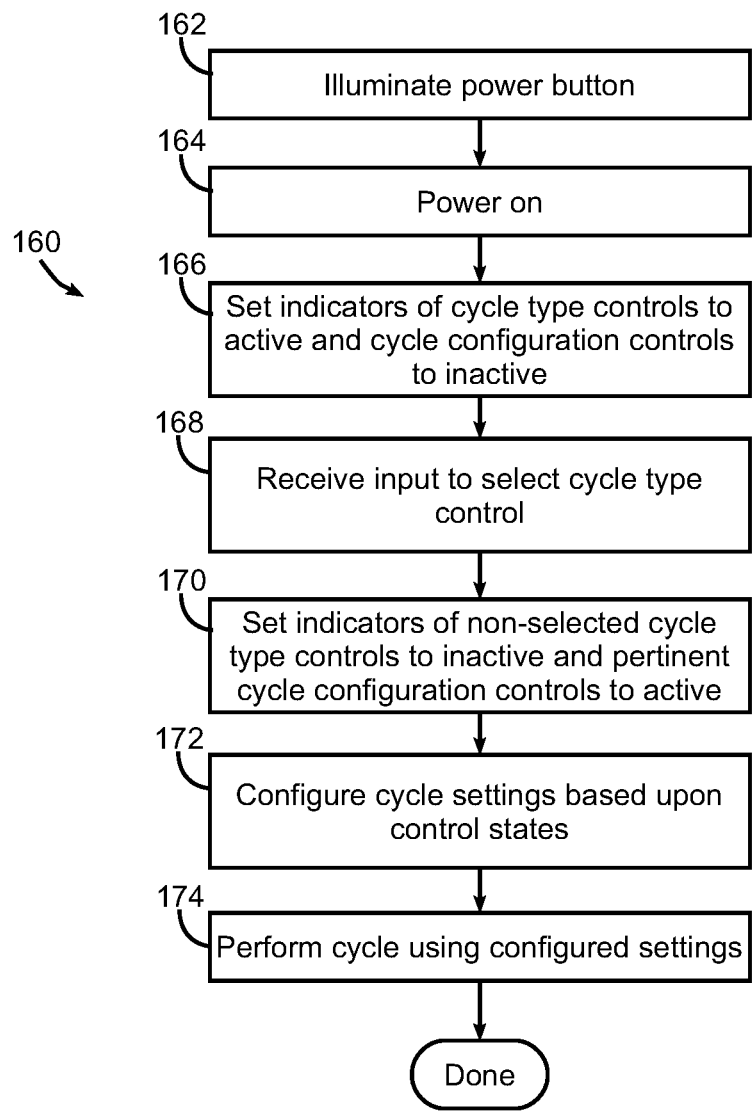
FIG. 6 is a flowchart illustrating an example sequence of operations for configuring and performing a wash cycle with the user interface of FIG. 5.
Figure 7:
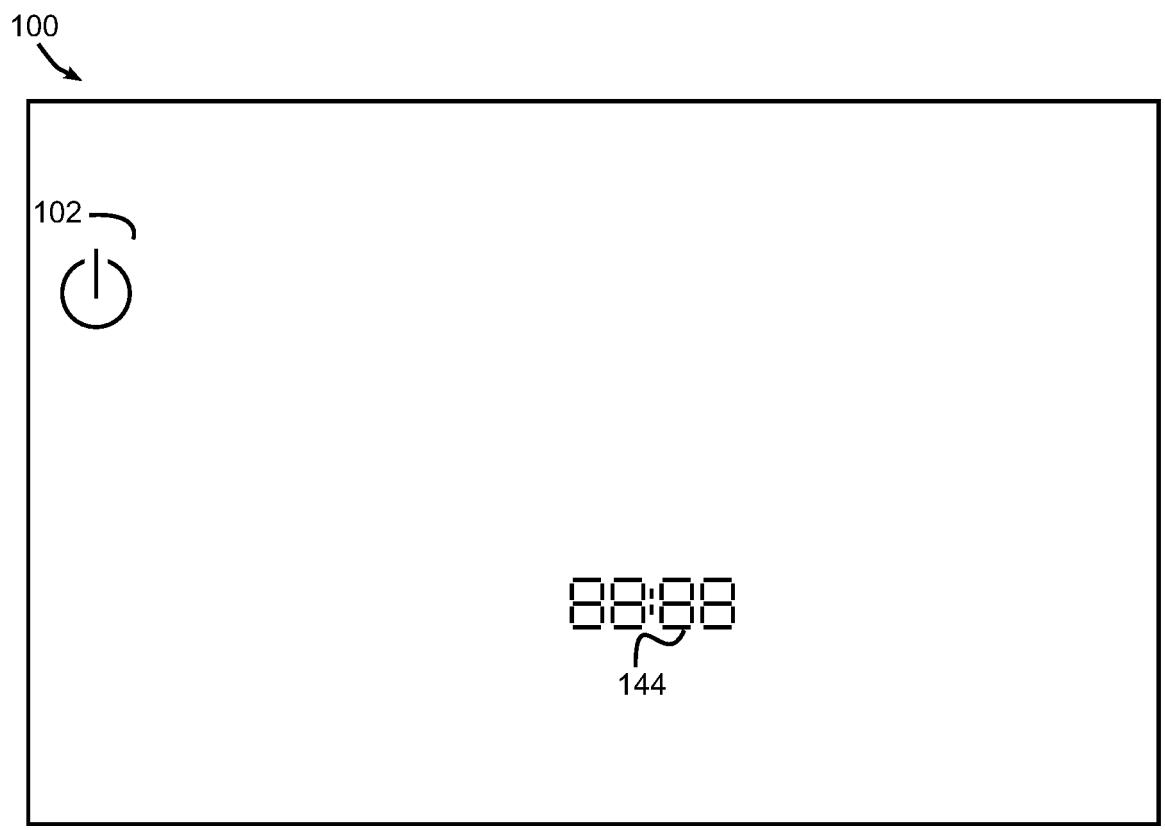
FIGS. 7-9 illustrate the user interface of FIG. 5 at different stages of configuring a wash cycle.

Now turning to FIG. 6 (and with additional reference to FIGS. 7-9), an example sequence of operations 160 is illustrated for configuring and performing a wash cycle using user interface 100. Sequence 160 may be performed by one or more processors (e.g., a processor in controller 70) to configure a laundry treatment cycle, e.g., a wash cycle in a laundry washing machine. The sequence may begin in block 162 with the laundry washing machine in an "off" state, during which only the power control 102 is set to the active state, and with all other controls and displays other than numerical display 144 set to inactive states, as illustrated in FIG. 7. In some embodiments, for example, numerical display 144 may display a time of day.

Figure 8:
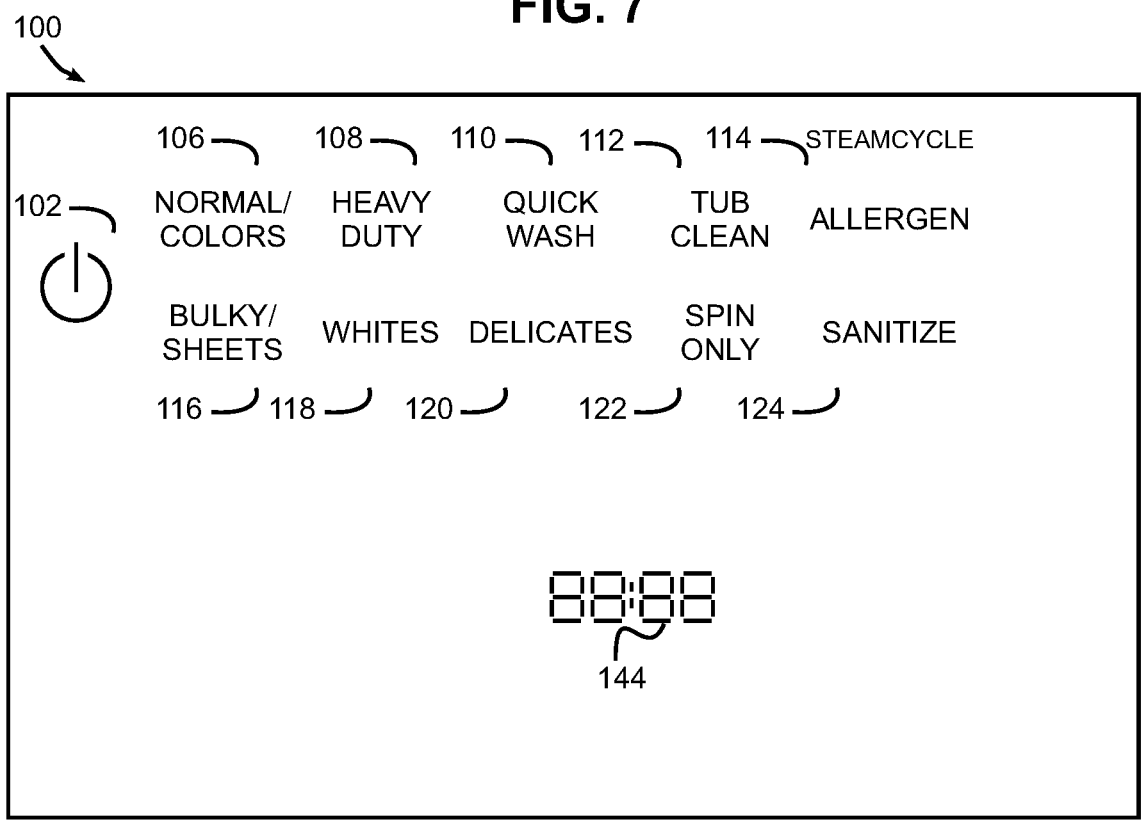

Returning to FIG. 6, in response to user selection of power control 102, block 164 may power the laundry washing machine to an "on" state, and block 164 may set the indicators of cycle type controls 106-124 to the active state, while leaving the cycle configuration controls 126-142 in the inactive state, whereby the user interface may have the configuration illustrated in FIG. 8. It will be appreciated that in this configuration, the user interface is in the cycle type selection phase, and the user is able to select a cycle type by selecting one of the activated cycle type controls. Moreover, the user is not distracted by the cycle configuration controls that, because they are inactive, are substantially hidden from view by the user. As such, the user is better able to focus on the selection of a cycle type as an initial step in configuring the wash cycle.

Returning again to FIG. 6, in block 168, user input may be received at one of the cycle type controls 106-124 to select a cycle type for the wash cycle. In response to this selection, and as shown in block 170, the indicators of non-selected cycle type controls (e.g., all cycle type controls other than the cycle type control selected by the user) may be set to the inactive states to effectively hide their functions from the user, while the indicators for the cycle configuration controls 126-142 that are pertinent to the selected cycle type may be set to the active state to display the functions that may be performed with these active cycle configuration controls.

Figure 9:
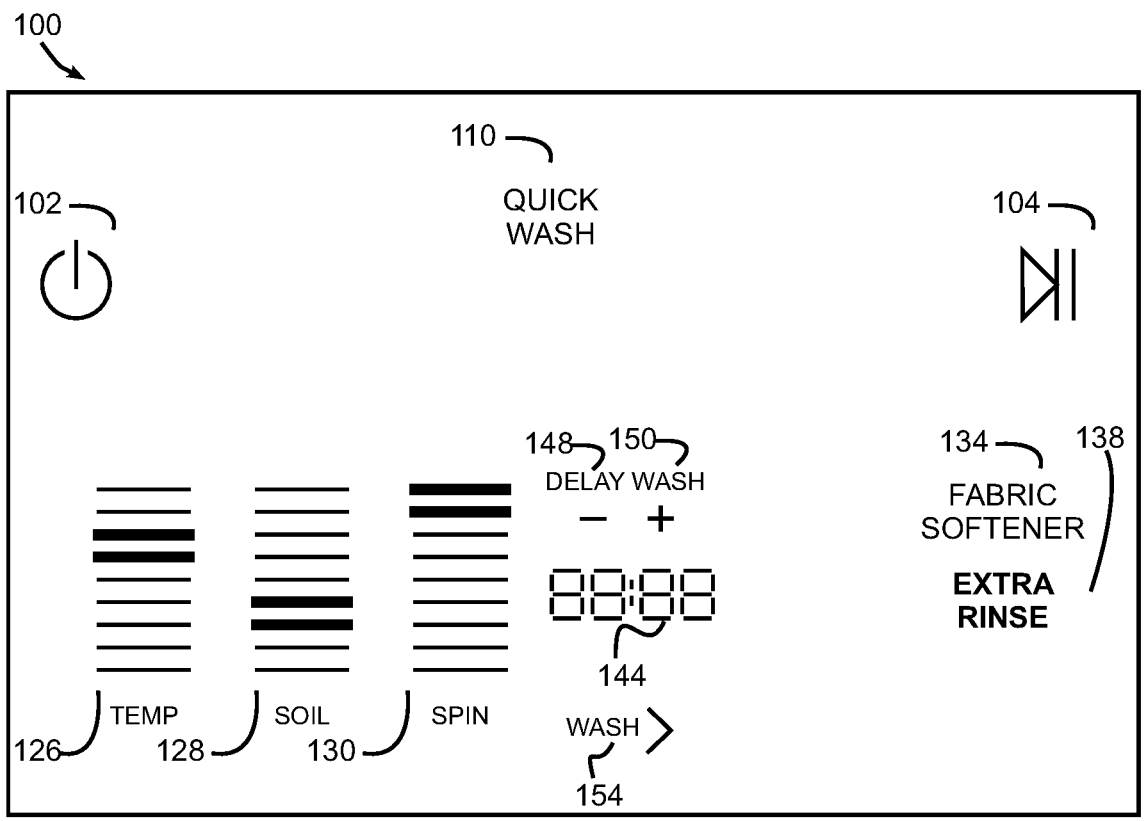

As shown in FIG. 9, for example, in response to user selection of quick wash control 110, a transition may occur to the cycle configuration phase (as represented by illumination of phase indicator 154), and the other cycle type controls 106-108 and 112-124 may be set to the inactive state, and various cycle configuration controls, e.g., temperature control 126, soil level control 128, spin control 130, fabric softener control 134 and extra rinse control 138 may have their respective indicators set to the active state to indicate that the associated functions are pertinent and selectable by a user in order to configure the "quick wash" cycle type. The other cycle configuration controls 132, 136, 140 and 142 may remain in the inactive state to indicate that these controls are not pertinent to the selected cycle type.

In addition, as controls 126, 128 and 130 are variable configuration controls, these controls may also be configured to display default setting values, as represented by the bold lines on each control. Optional features may also be highlighted in a selected state (e.g., illuminated with greater intensity and/or a different color) whenever set as a default or selected by a user, e.g., as represented by the bold illustration of extra rinse control 138 in FIG. 9. Additional controls may also be illuminated and set to the active state as appropriate for the context, including, for example, play/pause control 104 (since, in some instances, a cycle may be started without changing any of the settings once a cycle type is selected), and delay wash controls 148, 150 (enabling a user to set a delay time).

Returning again to FIG. 6, once the user interface is suitably configured as discussed in connection with block 170, in block 172 user input is received to configure the wash cycle using cycle configuration controls 106-124, and the cycle settings are configured according to the current states of the controls. Then, in block 174, once a user selects the play/pause control 104, the cycle is performed using the configured settings. Upon completion of the wash cycle using the configured settings, the sequence is complete. It will also be appreciated that in some embodiments, a user may also be permitted to pause an in-progress cycle using play/pause control 104, and in such instances, appropriate cycle configuration controls may be activated to enable a user to modify current settings and have those settings (to the extent they may still be relevant to the remainder of the cycle) used in the remainder of the cycle.

It will be appreciated that the arrangement of controls in user interface 100 may also facilitate user interaction. As illustrated in FIG. 5, for example, the controls are generally arranged in a top-to-bottom and left-to-right manner in terms of a user's interaction with the user interface, with numerical display 144 disposed within the center of different groups of controls. Power control 102 is provided at the far left and start/stop control 104 is provided at the far right of the interface, and cycle type controls 106-124 are generally located above the numerical display as well as above the cycle configuration controls 126-142. In addition, among the cycle configuration controls, the variable configuration controls 126-130 are located to the left of the numerical display, while the optional feature controls 132-142 are located to the right. With such an arrangement, progressing from power on, to cycle type selection, to variable configuration control customization, to optional feature customization, and to starting a cycle, the user interaction with user interface 100 is generally left-to-right and top-to-bottom, much in the manner in which one reads written text, and as such, the user interaction with user interface 100 follows a relatively natural and intuitive flow.

It will be appreciated, however, that other control arrangements may be used in other embodiments, including, for example, different arrangements of groups of cycle type selection controls, variable configuration controls and optional feature controls may be used, as well as inclusion of both variable configuration controls and optional feature controls within the same groupings, among others. Therefore, the invention is not limited to the specific control arrangement illustrated herein.

Figure 10:
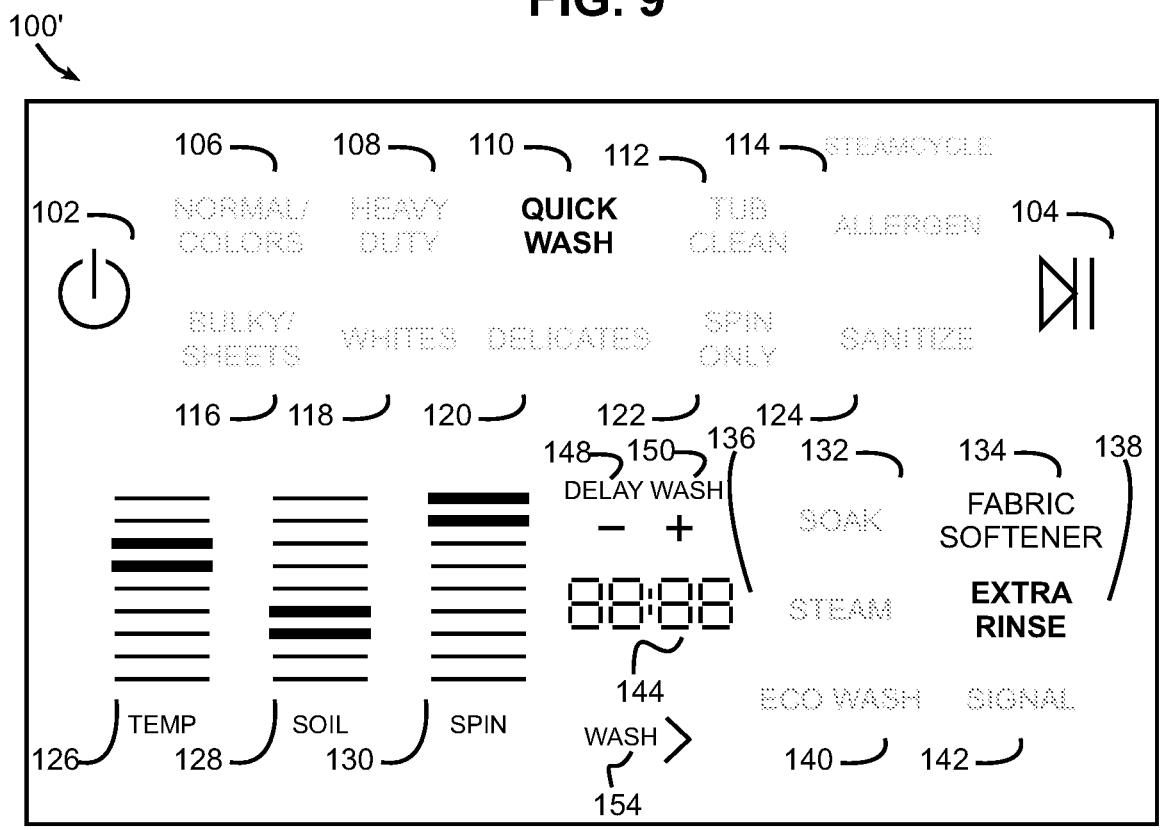
FIG. 10 illustrates an alternate implementation of the user interface of FIG. 5.

Now with reference to FIG. 10, it will be appreciated that the manner in which context-sensitive fixed-position controls are presented to a user when in the inactive and active states may vary from the manners disclosed in connection with FIGS. 7-9. For example, in an alternate user interface 100', which is illustrated when in the cycle configuration phase, whenever a cycle type control such as quick wash control 110 is selected, the inactive state for each non-selected cycle type control 106-1018 and 112-124 may still be illuminated, but with a dimmer level of illumination, a different color, or in other distinguishing manner. Furthermore, in some embodiments, when selected, quick wash control 110 may be transitioned to a selected state, e.g., using a different color or brighter illumination (represented by bold text in FIG. 10). Further, inactive cycle configuration controls such as controls 132, 136, 140 and 142 may similarly be illuminated with a dimmer level of illumination, a different color, or in other distinguishing manner. Other display variations that distinguish among the inactive state, the active state, and (if used) the selected state may be used in other embodiments consistent with the invention.

Figure 11:
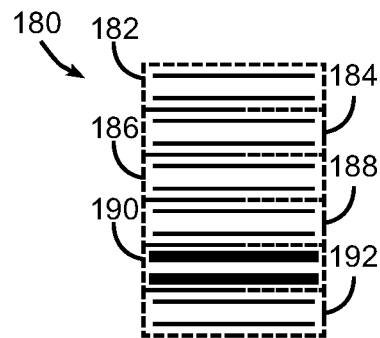
FIG. 11 illustrates an example implementation of a context-sensitive fixed-position slider control for use with the laundry washing machines of FIGS. 1-4.

Now turning to FIG. 11, a variable configuration control such as temperature control 126, soil level control 128, or spin control 130 may be implemented in some embodiments in the manner illustrated by variable configuration control 180. In this implementation, the control is implemented on a touch-sensitive glass panel using a plurality (e.g., six) touch-sensitive regions 182-192 that, when selected, select from among six different values for the associated setting. Moreover, as represented by region 190, whenever a particular region is selected, the indicator for that region may be illuminated in a selected state that is emphasized relative to the other regions. In some embodiments, the indicator for each touch-sensitive region below the selected region may be illuminated while the indicator for each touch-sensitive region above the selected region may not be illuminated such that the control has the appearance of a variable height bar. Other display representations may be used, as may other variable control designs, as will be appreciated by those of ordinary skill in the art having the benefit of the instant disclosure.

Figure 12:
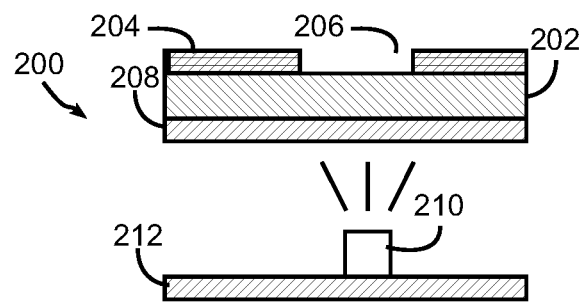
FIG. 12 is a functional cross-sectional view of a touch-sensitive glass panel control suitable for use in a context-sensitive fixed-position user interface consistent with the invention.

As noted above, in various embodiments different types of controls may be used to implement a context-sensitive fixed-position control. FIG. 12, for example, illustrates a touch-sensitive glass panel implementation where a touch-sensitive glass control 200 is formed in a region of a glass layer 202 that includes an opaque top layer 204 having one or more apertures 206 formed therein to define an indicator for the control. A capacitive sensor 208 is disposed on a bottom surface of glass layer 202 to detect touching by a user, and an LED or other light source 210 disposed on a circuit board 212 is used to illuminate the indicator for the control. In some embodiments, an interior portion of the control visible through the indicator is colored relative to the surface of glass layer 202 such that when the indicator is in the inactive state, the indicator is substantially invisible to the user. It will also be appreciated that layer 202, which is referred to as a glass layer, may be formed not only of glass, but also of various glass substitutes such as polycarbonate and other transparent or translucent materials.

Figure 13:
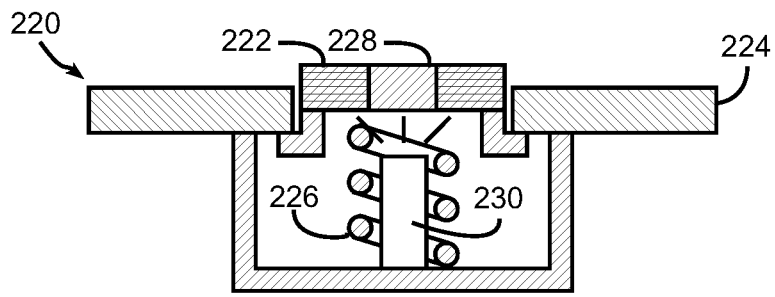
FIG. 13 is a functional cross-sectional view of a physical button control suitable for use in a context-sensitive fixed-position user interface consistent with the invention.

As another example, FIG. 13 illustrates a physical button implementation of a context-sensitive fixed-position control 220 whereby a button 222 projects above a panel surface 224 and is biased to an elevated position by a spring 226. A transparent or translucent indicator 228 is formed on the top surface of button 222, and an LED or other light source 230 is used to illuminate the indicator for the control.

Other types of controls may be used in a context-sensitive fixed-position control in other embodiments, as will be appreciated by those of ordinary skill having the benefit of the instant disclosure.

Therefore, it will be appreciated that a context-sensitive fixed-position user interface may enable a user to configure the settings of an appliance cycle in an efficient and intuitive manner, and with reduced display clutter and distractions.

Various additional modifications may be made to the illustrated embodiments consistent with the invention. Therefore, the invention lies in the claims hereinafter appended.

What is claimed is:

1. A laundry washing machine, comprising:
   a container rotatably disposed within a housing;
   a door mounted to the housing to provide access to the container;
   a drive system configured to rotate the container;
   a controller coupled to the drive system and configured to perform a wash cycle, the controller supporting a plurality of wash cycle types and a plurality of settings for the wash cycle, wherein at least a portion of the plurality of settings are unused by at least one of the plurality of wash cycle types; and
   a touch-sensitive glass control panel mounted on the housing or the door, the touch-sensitive glass control panel including a plurality of touch-sensitive regions respectively defining a plurality of controls, wherein each control includes an associated function performed by the control and an associated indicator disposed at a fixed position on the touch-sensitive glass control panel and configured to be selectively illuminated using a first level of illumination and a second level of illumination, wherein the first level of illumination is higher than the second level of illumination, wherein the indicator of each control includes an active state that uses the first level of illumination of the control to visually identify the associated function of the control when the controller sets the indicator of the control to the active state and an inactive state that uses the second level of illumination of the control to substantially hide the associated function of the control when the controller sets the indicator of the control to the inactive state, and wherein the plurality of controls includes:
  a plurality of wash cycle type controls, wherein the function of each wash cycle type control selects an associated wash cycle type from among the plurality of wash cycle types; and
  a plurality of wash cycle configuration controls, wherein the function of each wash cycle configuration control configures one or more associated settings among the plurality of settings;
wherein the controller configures the wash cycle prior to performing the wash cycle based upon user input received through the touch-sensitive glass control panel;
wherein during a wash cycle type selection phase the controller sets to the active state the indicator of each of the plurality of wash cycle type controls, sets to the inactive state the indicator of each of the plurality of wash cycle configuration controls, and receives user input that selects a first wash cycle type control among the plurality of wash cycle type controls; and
wherein during a cycle configuration phase initiated after the first wash cycle type control is selected, the controller sets to the inactive state the indicator of each wash cycle type control other than the first wash cycle type control, sets to the active state the indicators of one or more wash cycle configuration controls from among the plurality of wash cycle configuration controls that are associated with functions that are pertinent to the associated wash cycle type for the first wash cycle type control, and receives user input that configures one or more settings among the plurality of settings using the one or more wash cycle configuration controls having indicators set to the active state.

2. An appliance, comprising:
a controller configured to perform an appliance cycle with the appliance, the controller supporting a plurality of cycle types and a plurality of settings for the appliance cycle, wherein at least a portion of the plurality of settings are unused by at least one of the plurality of cycle types; and
a user interface coupled to the controller and including a plurality of controls, wherein each control includes an associated function performed by the control and an associated indicator disposed at a fixed position in the user interface and configured to be selectively illuminated using a first level of illumination and a second level of illumination, wherein the first level of illumination is higher than the second level of illumination, wherein the indicator of each control includes an active state that uses the first level of illumination of the control to visually identify the associated function of the control when the controller sets the indicator of the control to the active state and an inactive state that substantially uses the second level of illumination of the control to substantially hide the associated function of the control when the controller sets the indicator of the control to the inactive state, and wherein the plurality of controls includes:
  a plurality of cycle type controls, wherein the function of each cycle type control selects an associated cycle type from among the plurality of cycle types; and
  a plurality of cycle configuration controls, wherein the function of each cycle configuration control configures one or more associated settings among the plurality of settings;
wherein the controller configures the appliance cycle prior to performing the appliance cycle based upon user input received through the user interface;
wherein during a cycle type selection phase the controller sets to the active state the indicator of each of the plurality of cycle type controls, sets to the inactive state the indicator of each of the plurality of cycle configuration controls, and receives user input that selects a first cycle type control among the plurality of cycle type controls; and
wherein during a cycle configuration phase initiated after the first cycle type control is selected, the controller sets to the inactive state the indicator of each cycle type control other than the first cycle type control, sets to the active state the indicators of one or more cycle configuration controls from among the plurality of cycle configuration controls that are associated with functions that are pertinent to the associated cycle type for the first cycle type control, and receives user input that configures one or more settings among the plurality of settings using the one or more cycle configuration controls having indicators set to the active state.

3. The appliance of claim 2, wherein the appliance includes a container rotatably disposed in a housing, a door mounted to the housing to provide access to the container, and a drive system configured to rotate the container, wherein the controller is coupled to the drive system and the appliance cycle comprises a wash cycle for washing a load of clothing, and wherein the user interface is mounted on the housing or the door.

4. The appliance of claim 2, wherein the user interface comprises a touch-sensitive glass control panel, wherein each of the plurality of controls comprises a touch-sensitive region of the touch-sensitive glass control panel, and wherein the indicator of each of the plurality of controls is backlit through the touch-sensitive glass control panel.

5. The appliance of claim 4, wherein the controller is configured to disable illumination of each of the plurality of controls when in the inactive state such that the indicator of each of the plurality of controls substantially invisible to the user when in the inactive state.

6. The appliance of claim 2, wherein the controller is configured to illuminate each of the plurality of controls at the second level of illumination when in the inactive state such that the indicator of each of the plurality of controls is illuminated in the inactive state with an intensity that is dimmer than in the active state.

7. The appliance of claim 2, wherein the controller is configured to disable illumination of each of the plurality of controls when in the inactive state such that the indicator of each of the plurality of controls is not illuminated when in the inactive state.

8. The appliance of claim 2, wherein the controller is further configured to, during the cycle configuration phase, set the first cycle type control to a selected state that is visually distinct from the active state based upon a different level of illumination and/or color.

9. The appliance of claim 2, wherein the plurality of controls includes at least one physical button.

10. The appliance of claim 2, wherein the plurality of controls includes at least one membrane switch.

11. The appliance of claim 2, wherein the plurality of cycle configuration controls includes at least one variable configuration control that selects from among a plurality of setting values for a first setting among the plurality of settings.

12. The appliance of claim 11, wherein the at least one variable configuration controls is a temperature control, a soil level control or a spin control.

13. The appliance of claim 11, wherein the at least one variable configuration control includes a plurality of touch-sensitive regions that select from among the plurality of setting values.

14. The appliance of claim 11, wherein the plurality of cycle configuration controls includes at least one optional feature control that selectively enables and disables an optional feature.

15. The appliance of claim 14, wherein the user interface further includes a numerical display.

16. The appliance of claim 14, wherein the user interface further includes a power control and a start/pause control, wherein the controller is configured to set the start/pause control to the active state during the cycle configuration phase and set the start/pause control to the inactive state during the cycle type selection phase.

17. The appliance of claim 14, wherein the controller is further configured to, in the cycle configuration phase, initialize a variable configuration control or an optional feature control to a default value associated with the first cycle type control.

18. The appliance of claim 14, wherein the user interface further includes a phase indicator, wherein the controller is configured to set the phase indicator to the active state during the cycle configuration phase.

19. An appliance, comprising:
- a controller configured to perform an appliance cycle with the appliance, the controller supporting a plurality of cycle types and a plurality of settings for the appliance cycle, wherein at least a portion of the plurality of settings are unused by at least one of the plurality of cycle types; and
- a user interface coupled to the controller and including a plurality of controls, wherein each control includes an associated function performed by the control and an associated indicator disposed at a fixed position in the user interface and configured to be selectively illuminated by a light source, wherein the indicator of each control includes an active state that visually identifies the associated function of the control when the controller sets the indicator of the control to the active state and illuminates the light source for the indicator of the control and an inactive state that substantially hides the associated function of the control when the controller sets the indicator of the control to the inactive state and disables the light source for the indicator of the control, and wherein the plurality of controls includes:
  - a plurality of cycle type controls, wherein the function of each cycle type control selects an associated cycle type from among the plurality of cycle types; and
  - a plurality of cycle configuration controls, wherein the function of each cycle configuration control configures one or more associated settings among the plurality of settings;
- wherein the controller configures the appliance cycle prior to performing the appliance cycle based upon user input received through the user interface;
- wherein during a cycle type selection phase the controller sets to the active state the indicator of each of the plurality of cycle type controls, sets to the inactive state the indicator of each of the plurality of cycle configuration controls, and receives user input that selects a first cycle type control among the plurality of cycle type controls; and
- wherein during a cycle configuration phase initiated after the first cycle type control is selected, the controller sets to the inactive state the indicator of each cycle type control other than the first cycle type control, sets to the active state the indicators of one or more cycle configuration controls from among the plurality of cycle configuration controls that are associated with functions that are pertinent to the associated cycle type for the first cycle type control, and receives user input that configures one or more settings among the plurality of settings using the one or more cycle configuration controls having indicators set to the active state.

* * * * *